United States Patent
Nagano

[11] Patent Number: 5,229,836
[45] Date of Patent: Jul. 20, 1993

[54] POSITION DETECTING APPARATUS FOR A MOVING BODY

[75] Inventor: Masatoshi Nagano, Tokyo, Japan
[73] Assignee: Canon Kabushiki Kaisha, Tokyo, Japan
[21] Appl. No.: 770,311
[22] Filed: Oct. 3, 1991
[30] Foreign Application Priority Data
Oct. 3, 1990 [JP] Japan .................. 2-265937
[51] Int. Cl.$^5$ .......................... G01B 11/00
[52] U.S. Cl. ...................... 356/373; 33/707; 250/237 G
[58] Field of Search ........... 356/373, 374, 375; 250/237 G; 33/707

[56] References Cited

U.S. PATENT DOCUMENTS

| | | | |
|---|---|---|---|
| 3,812,352 | 5/1974 | MacGovern | 250/237 G |
| 4,297,033 | 10/1981 | Nelle | 356/374 |
| 4,636,079 | 1/1987 | Rieder | 356/374 |
| 4,672,201 | 6/1987 | Welker | 356/374 |

FOREIGN PATENT DOCUMENTS

| | | | |
|---|---|---|---|
| 128813 | 8/1982 | Japan | 356/374 |
| 60-093311 | 5/1985 | Japan . | |
| 60-093312 | 5/1985 | Japan . | |
| 59187203 | 10/1987 | Japan . | |

*Primary Examiner*—F. L. Evans
*Attorney, Agent, or Firm*—Fitzpatrick, Cella, Harper & Scinto

[57] ABSTRACT

This specification discloses an apparatus which includes a detection unit body having light projecting means and light receiving means disposed in opposed relationship with and at a predetermined distance from the light projecting means, a mask member and a slit member each provided with a plurality of slit openings periodically in a direction orthogonal to the direction of opposition of the light projecting means and the light receiving means and interposed between the light projecting means and the light receiving means in such a manner that the directions of arrangement of the slits are the same direction and in which the mask member is mounted on the light receiving means and the slit member is disposed so as to be movable relative to the detection unit body, and of the light beam from the light projecting means, a light beam passed through the slit openings in both of the slit member and the mask member is detected by the light receiving means, and the relative positional information of the detection unit body and the slit member is detected by the utilization of the output signal from the light receiving means.

5 Claims, 3 Drawing Sheets

POSITION DETECTING APPARATUS FOR A MOVING BODY

BACKGROUND OF THE INVENTION

1. Field of the Invention

This invention relates to a position detecting apparatus for a moving body, and particularly to a position detecting apparatus for a moving body which is made compact as a whole and yet designed to highly accurately detect the relative positional information of slit means provided with respect to a moving body moving relative to a detecting unit body having light projecting means and light receiving means.

2. Related Background Art

A so-called photoreflector, a photointerrupter or the like is known as a detecting apparatus designed to photoelectrically read a predetermined pattern provided with respect to a moving body by the use of light projecting means and light receiving means to thereby detect positional information such as the amount of movement of the moving body.

Also, measuring instruments which can accomplish the measurement of one submicron or less by the utilization of the interference of laser light are proposed, for example, by Japanese Laid-Open Patent Application No. 59-187203, Japanese Laid-Open Patent Application No. 60-93311 and Japanese Laid-Open Patent Application No. 60-93312. Among these, the measuring instrument utilizing a laser is relatively bulky and therefore is used in a large apparatus.

On the other hand, a detecting apparatus such as a photoreflector or a photointerrupter is relatively small and therefore is incorporated for use for example, in a small space in a lens barrel or the like.

Also, each of these detecting apparatuses detects the repetition signal of a light signal and a dark signal based on the movement of a pattern of predetermined pitch provided with respect to a moving body by the use of light projecting means and light receiving means to thereby detect the amount of movement of the moving body. For example, by the use of a position detecting sensor such as a PSD (position sensitive device), the amount of movement of a slit formed on the detection surface thereof is measured to thereby detect the positional information of the moving member.

FIG. 4 of the accompanying drawings is a schematic view of the essential portions of a conventional position detecting apparatus of this kind.

In FIG. 4, the reference numeral 11 designates a light projecting element which is, for example, an iRED (infrared light emitting diode). The reference numeral 12 denotes a light receiving element such as a PSD. The light receiving element 12 has a light receiving surface 12a of a predetermined length. The reference numeral 13 designates a moving body on the surface of which is provided with a slit 13a.

The image of the slit 13a is projected onto the light receiving surface 12a of the PSD 12 by a light beam from the light projecting element 11. As the moving body 13 moves in the direction of arrow 14 at this time, the image of the slit 13a projected onto the light receiving surface 12a also moves. The PSD 12 is such that, in conformity with the position of the slit image projected onto the surface thereof, the output ratio from an electrode A and an electrode B varies and therefore, by the amount of variation at this time being measured, positional information such as the amount of movement of the moving body 13 is detected.

In the position detecting apparatus shown in FIG. 4, if a plurality of slits are appropriately provided in the moving body 13, an amount of movement greater than the length of the light receiving surface 12a in the direction of detection can be detected.

The detection accuracy of the positional information of the moving body 13 in the position detecting apparatus shown in FIG. 4 depends on the detection accuracy of the light receiving element 12, that is, depends on the detection resolving power as to how finely the positional information of the slit image projected onto the light receiving surface 12a of the light receiving element 12 is resolved and detected.

As regards the PSD used in the position detecting apparatus shown in FIG. 4, it is generally necessary to design the light receiving surface thereof so as to have a predetermined or larger size, but if the light receiving surface becomes large, the detection resolving power will be reduced in many cases.

This has led to the problem that where the detection of the positional information of a moving body is to be effected by the apparatus shown in FIG. 4 and by the use of a light receiving element such as a PSD of a predetermined size, the positional information cannot be detected at an accuracy higher than the detection resolving power of the light receiving element.

SUMMARY OF THE INVENTION

The present invention has as its object the provision of a position detecting apparatus for a moving body which utilizes a first member (mask member) and a second member (slit member) each provided with a plurality of slits at a predetermined period, whereby the apparatus can be made compact as a whole and yet can detect the positional information of the moving body at an accuracy higher than the detection resolving power of a light receiving element.

The position detecting apparatus for a moving body according to the present invention includes a detection unit body having light projecting means and light receiving means disposed in opposed relationship with and at a predetermined distance from said light projecting means, a mask member and a slit member each periodically provided with a plurality of slit openings in a direction orthogonal to the direction of opposition of said light projecting means and said light receiving means and interposed between said light projecting means and said light receiving means in such a manner that the directions of arrangement of said slits are the same direction, characterized in that said mask member is mounted on the light receiving surface of said light receiving means and said slit member is disposed so as to be movable relative to said detection unit body, and of the light beam from said light projecting means, a light beam passed through the slit openings in both of said slit member and said mask member is detected by said light receiving means, and the relative positional information of said detection unit body and said slit member is detected by the utilization of the output signal from said light receiving means.

DETAILED DESCRIPTION OF THE PREFERRED EMBODIMENTS

Figure 1:
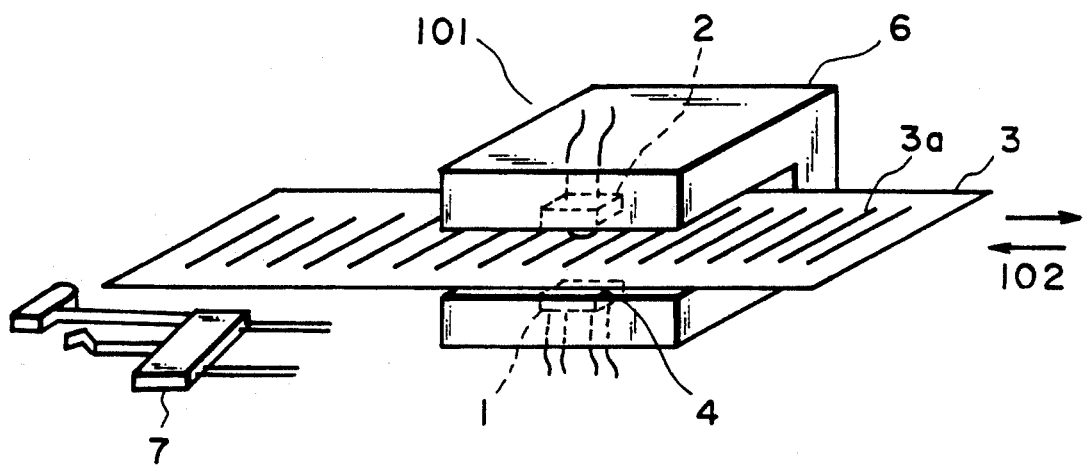
FIG. 1 is a perspective view of the essential portions of an embodiment of the present invention.
Figure 2:
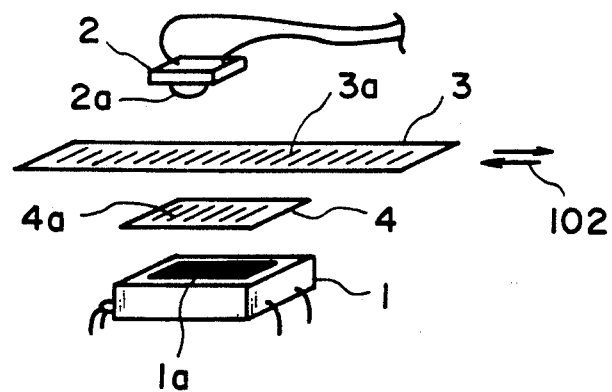
FIG. 2 is a schematic view of the essential portions of FIG. 1.
Figure 5:
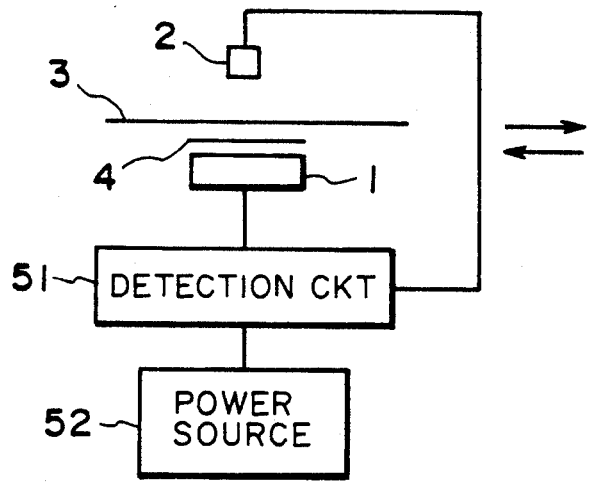
FIG. 5 shows the construction of the essential portions of the present invention.

FIG. 1 is a perspective view of the essential portions of the apparatus of the present invention, FIG. 2 is a schematic view of the essential portions of FIG. 1, FIGS. 3A to 3D illustrate the principle of detection of the position detecting apparatus for a moving body according to the present invention, and FIG. 5 shows the construction of the essential portions of an embodiment of the present invention.

In the figures, the reference numeral 1 designates light receiving means having a light receiving surface 1a of a predetermined size for effecting the detection of the positional information of a moving body (not shown) moving in the direction of arrow 102. The light receiving means 1 comprises, for example, a conventional PSD or the like, and outputs a position signal conforming to the incidence position of a light beam. The reference numeral 2 denotes light projecting means disposed in opposed relationship with and at a predetermined interval from the light receiving means 1. The light projecting means 2 comprises a light emitting diode, a semiconductor laser or the like, and projects a light beam of a predetermined size toward the light receiving means 1 through a light projecting system 2a. The light receiving means 1 and the light projecting means 2 together constitute one element of a detection unit body 101, and are constructed integrally with each other so as to be opposed to each other by a holding member 6.

Figure 6:
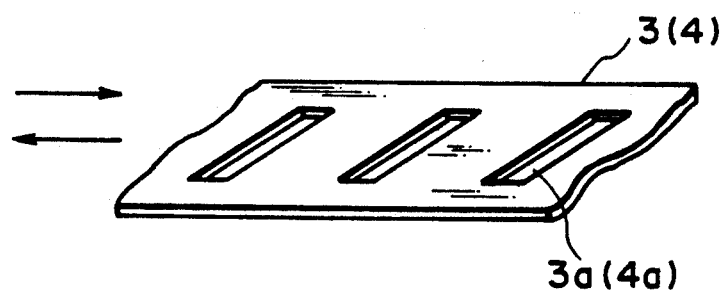
FIG. 6 is an illustration of a portion of FIG. 1.

The reference numeral 3 designates a slit member provided with respect to the moving body (not shown). A plurality of slit openings 3a as shown, for example, in FIG. 6, are provided periodically (at a predetermined pitch) in the surface of the slit member. The reference numeral 4 denotes a mask member in the surface of which there are periodically provided a plurality of slit openings 4a as shown in FIG. 6.

The slit member 3 and the mask member 4 are shown commonly in FIG. 6, but actually the periods or pitches of the slit openings 3a and 4a differ from each other. The slit member 3 and the mask member 4 are disposed so that the directions of arrangement of the slit openings 3a, 4a thereof may be orthogonal to the direction of opposition of the light receiving means 1 and the light projecting means 2, and moreover are interposed between the light receiving means 1 and the light projecting means 2 in such a manner that the directions of arrangement of the slit openings 3a, 4a are the same.

The mask member 4 is mounted on and fixed to the light receiving surface 1a of the light receiving means 1. The slit member 3 is movable relative to the detection unit body 101 and with respect to the direction of position detection indicated by arrow 102 between the light receiving means 1 and the light projecting means 2.

The reference numeral 7 designates initial position detecting means provided directly on or in predetermined positional relationship with the slit member 3, and comprising, for example, a leaf spring switch or the like. The initial position detecting means 7 is designed to be closed or opened when the slit member 3 is set at its initial position, and is used when the absolute positional information of the slit member 3 is to be detected. The initial position detecting means 7 is omitted when the absolute positional information of the slit member 3 is not detected.

In the present embodiment, the position of incidence of the light beam from the light projecting means 2 which is passed through both of one of the plurality of slit openings in the slit member 3 and one of the plurality of slit openings in the mask member 4 onto the light receiving surface 1a of the light receiving means 1, i.e., the position of the slit image projected onto the light receiving surface 1a, is detected to thereby detect the relative positional information of the detection unit body 101 and the slit member 3 (the moving body).

The principle of detection of the positional information of the moving body (the slit member 3) in the present invention will now be described with reference to FIG. 3. In FIG. 3, the light projecting means 2 is omitted, but the light beam from the light projecting means 2 is applied from above the slit member 3 to the area of the mask member 4 in which the slit openings 4a are arranged.

Figure 3A:
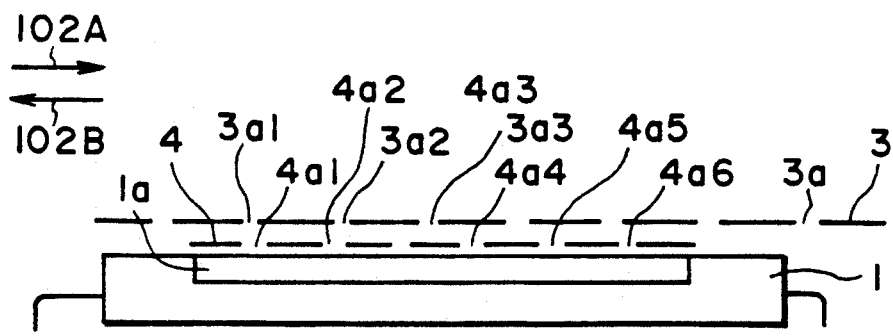
FIGS. 3A to 3D illustrate the principle of detection of a moving body in the present invention.

Let it be assumed that the positional relation between the light receiving means 1 and the slit member 3, i.e., the positional relation between the mask member 4 and the slit member 3, is such as shown in FIG. 3A.

The period of the slit openings 3a in the slit member 3 and the period of the slit openings 4a in the mask member 4 differ from each other as previously described, and in FIG. 3A, the periods at this time are set so that only the slit opening 4a1 of the plurality of slit openings 4a(4a1-4a6) in the mask member 4 may coincide with the slit opening 3a1 of the plurality of slit openings 3a (3a1 . . . ) in the slit member 3, that is, so that only one of the slit openings 3a and only one of the slit openings 4a may coincide with each other, and therefore, as shown in FIG. 3A, the light beam from the light projecting means (not shown) passes through only the slit opening 3a1 and the slit openings 4a1 and is incident on the light receiving surface 1a of the light receiving means 1, thus forming a slit image at a predetermined location on the light receiving surface 1a.

Figure 3B:
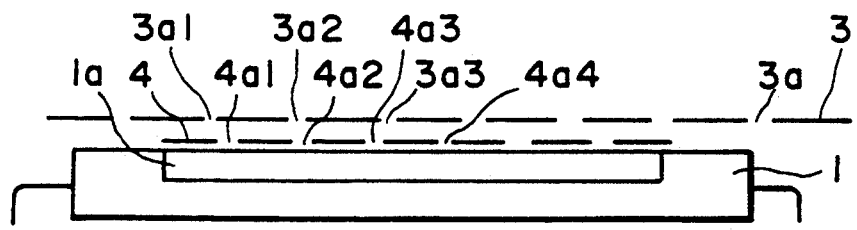

Let it now be assumed that the slit member 3 has slightly moved in the direction of arrow 102B. Thereupon, only the slit opening 4a2 in the mask member 4 now comes into coincidence with the slit opening 3a2 in the slit member 3. Accordingly, a slit image by the light beam passed through the slit opening 3a2 and the slit opening 4a2 is formed on the light receiving surface 1a of the light receiving means 1 at a different location in the direction of position detection. At this time, as shown in FIGS. 3A and 3B, the amount of variation in the slit image formed on the light receiving surface 1a of the light receiving means 1 is much greater than the amount of movement of the slit member 3. That is, the light receiving means 1 can detect the positional information in a state in which the amount of movement of the slit member 3 has been enlarged (amplified).

Therefore, in the present embodiment, the positional information of the moving body (the slit member 3) can be detected at an accuracy higher than the inherent position detection accuracy (position resolving power) of the light receiving means 1.

When the slit member 3 is further moved in the direction of arrow 102B, only the slit opening 4a3 in the mask member 4 comes into coincidence with only the slit opening 3a3 in the slit member 3.

Figure 3C:
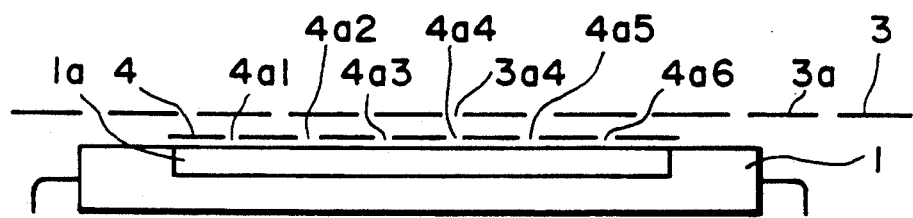
Figure 3D:
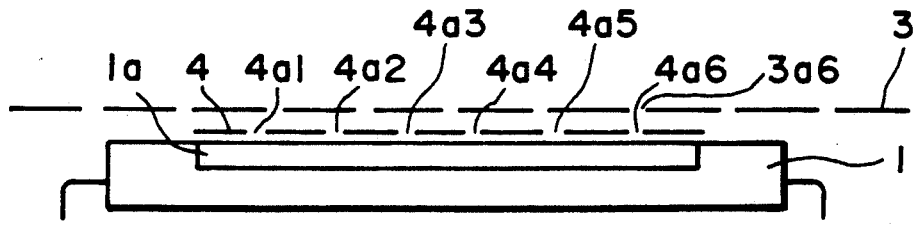
Figure 4:
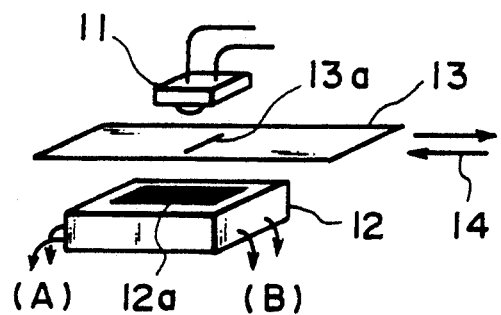
FIG. 4 is a schematic view of a conventional position detecting apparatus.

When in a similar manner, the slit member 3 is thereafter moved in the direction of arrow 102B as shown in FIGS. 3C and 3D, the position of the slit image formed on the light receiving surface 1a of the light receiving means 1, if shown by the use of the slit openings 4a in the mask member 4, periodically changes as indicated by 4a3→4a4→4a5→4a6→4a1→4a2→. . . .

In the present embodiment, the period of the position change of the slit image formed on the light receiving surface 1a at this time is counted by detection means 51 shown in FIG. 5 to thereby detect the information of the position at which the slit image is formed. Thus, the amount of movement of the slit member 3 relative to the light receiving means 1, i.e., the detection unit body 101, is found.

When in FIG. 3, the slit member 3 is moved in the direction of arrow 102A opposite to the direction of arrow 102B, the position of the slit image formed on the light receiving surface 1a of the light receiving means 1, if shown by the use of the slit openings 4a in the mask member 4, periodically changes as indicated by 4a1→4a6→4a5→4a4→4a3→4a2→4a1→4a6→. . . . Accordingly, in a manner similar to that previously described, the amount of movement of the slit member 3 relative to the detection unit body 101 can be found.

If in the present embodiment, use is made of initial position detecting means 7 provided with respect to the slit member 3, the initial position of the slit member 3 can be found and the absolute positional information of the slit member 3 can be detected.

Even if in the present embodiment, the slit member 3 is fixed and instead, the detection unit body 101 having the light receiving means 1 and the light projecting means 2 is moved in the direction of arrow 102, the relative positional information of the detection unit body 101 and the slit member 3 (the moving body) can be detected.

Any switch the ON or OFF of which can be detected in the initial position like a switch using light such as a photointerrupter or a photoreflector or an electrical switch utilizing electrostatic capacity is usable as the initial position detecting means 7.

According to the present invention, there can be achieved a position detecting apparatus for a moving body which can detect the positional information of the moving body at an accuracy higher than the detection resolving power of light receiving means by using a mask member and a slit member each provided with a plurality of slit openings at a predetermined period as previously described.

Also, if the light projecting means and the light receiving means are constructed integrally with each other by means of a holding member, the positional relation between the light projecting means and the light receiving means can be designed more accurately and there can be achieved a position detecting apparatus for a moving body which is compact and simple as a whole and yet is highly accurate.

What is claimed is:

1. A position detecting apparatus including:
   light projecting means;
   light receiving means;
   a first member disposed between said light projecting means and said light receiving means and having a plurality of openings of a predetermined pitch in a certain direction;
   a second member disposed between said light projecting means and said light receiving means and having a plurality of openings of a pitch differing from said pitch in said certain direction; and
   detection means for detecting a light receiving position of said light receiving means varied by said first and second members being moved relative to each other,
   wherein an amount of variation of said light receiving position is much greater than a corresponding amount of relative movement between said first member and said second member causing said amount of variation of said light receiving position.

2. A position detecting apparatus according to claim 1, wherein said detection means detects the position of the light of said light projecting means passed through the openings in said first and second members.

3. A position detecting apparatus according to claim 1, wherein the openings in said first and second members are rectangular.

4. A position detecting apparatus according to claim 1, wherein said light projecting means and said light receiving means are integral with each other.

5. A position detecting apparatus according to claim 1, wherein said light receiving means is a PSD (position sensitive device) sensor.

* * * * *

UNITED STATES PATENT AND TRADEMARK OFFICE
CERTIFICATE OF CORRECTION

PATENT NO. : 5,229,836
DATED : July 20, 1993
INVENTOR(S) : MASATOSHI NAGANO

It is certified that error appears in the above-indentified patent and that said Letters Patent is hereby corrected as shown below:

On the title page: Item

[56] REFERENCES CITED

Foreign Patent Documents,
"59187203 10/1987 Japan" should read
--59-187203 10/1987 Japan--.

COLUMN 4

Line 40, "openings 4a1" should read --opening 4a1--.

COLUMN 6

Line 46, "sensor." should read --type sensor.--.

Signed and Sealed this

Twenty-fourth Day of May, 1994

Attest:

BRUCE LEHMAN

Attesting Officer     Commissioner of Patents and Trademarks